April 25, 1933.    J. L. RICHARDSON    1,905,605
AUTOMOBILE BED
Filed June 15, 1929    2 Sheets-Sheet 1
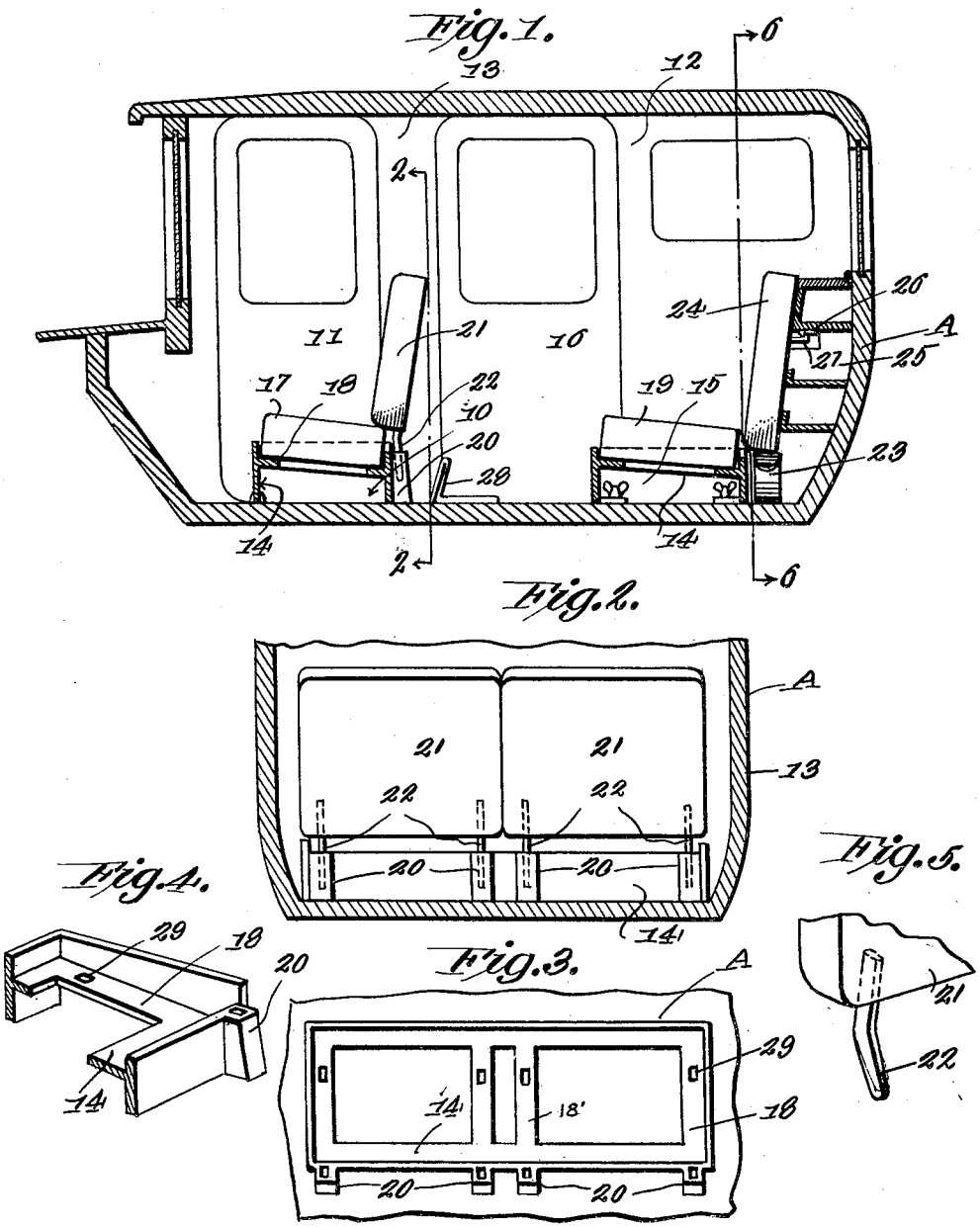
Inventor
JOSEPH L. RICHARDSON April 25, 1933.   J. L. RICHARDSON   1,905,605
AUTOMOBILE BED
Filed June 15, 1929   2 Sheets-Sheet 2
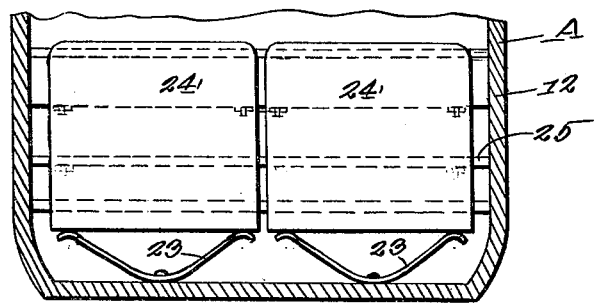
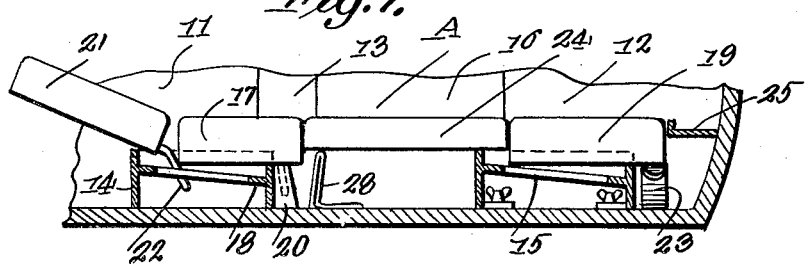
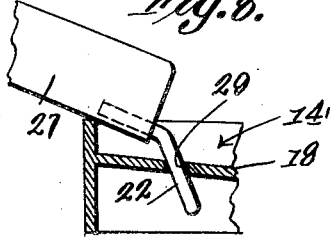
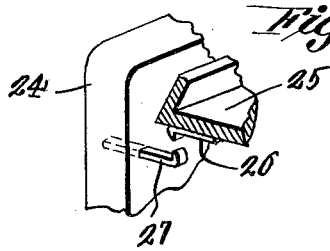
Inventor
JOSEPH L. RICHARDSON Patented Apr. 25, 1933

1,905,605

UNITED STATES PATENT OFFICE

JOSEPH L. RICHARDSON, OF NASHVILLE, ARKANSAS

AUTOMOBILE BED

Application filed June 15, 1929. Serial No. 371,191.

This invention relates to improvements in automobile beds and has more particular reference to a convertible seat construction for motor vehicles, whereby the seat cushions and back rests of the motor vehicle may be positioned to form a horizontal bed bottom of several different sizes to suit various needs and is an improvement over my prior Patents 1,714,891 and 1,715,308, issued to me respectively May 28th, 1929.

One of the primary objects of the present invention is the provision of a novel arrangement of the vehicle seat backs and cushions and supports therefor, whereby the same may be so disposed as to form a horizontal bed bottom of different sizes to suit various conditions and needs.

A further important object of my invention is to provide an improved automobile bed construction of the above character, which is extremely simple and durable in construction as well as efficient in operation and wherein the conversion of the seats into a horizontal bed bottom may be effected with extreme facility and ease.

With these and other objects in view, the invention consists in the novel construction, arrangement and formation of parts, as will be hereinafter more specifically described, claimed, and illustrated in the accompanying drawings, in which drawings:

Figure 1 is a fragmentary longitudinal sectional view of a motor vehicle body of the sedan type having seats constructed in accordance with the present invention, with the seat cushions and back rests of the seats normally positioned to provide the front and rear seats of the vehicle;

Figure 2 is a fragmentary transverse section through the sedan body showing the improved front seat in rear elevation, the section being taken on the line 2—2 of Figure 1 looking in the direction of the arrows;

Figure 3 is a fragmentary top plan view of the front seat frame or base with the cushions and back removed;

Figure 4 is a fragmentary detail perspective view of the front seat base or frame with the cushions and back removed;

Figure 5 is a fragmentary detail perspective view of the lower corner of one front seat back;

Figure 6 is a fragmentary transverse section through the vehicle body showing the rear seat back in side elevation, the section being taken on the line 6—6 of Figure 1 looking in the direction of the arrows;

Figure 7 is a fragmentary longitudinal section through the vehicle body showing the seat cushions and back arranged to form the bed bottom;

Figure 8 is an enlarged detail sectional view illustrating the means of associating the front seat back with the front seat base to form the bed bottom;

Figure 9 is a detail fragmentary perspective view illustrating the connection of the rear seat back with the vehicle body.

Referring to the drawings in detail, wherein similar reference characters designate corresponding parts throughout the several views, the letter A generally indicates a motor vehicle body of the sedan type having spaced front and rear seats 10 and 15 of special construction, in accordance with the present invention, and access to which is respectively had through the front and rear doors 11 and 16. As well known in the art, motor vehicles of this type are provided with permanent side wall portions 12 at the sides of the rear seat and rearwardly of the rear doors 16, while permanent pillars or posts 13 are provided at the sides of the front seat between the doors 11 and 16.

As shown, each seat of the vehicle embodies a relatively short or low built hollow supporting base 14, which is rigidly secured upon the floor of the vehicle body and is of such a size as to extend from side to side of the latter.

Two seat cushions 17 are provided for both the front and rear seats, being removably supported by ledges or flanges 18 of the bases, as clearly shown in Figure 1 of the drawings. The flanges 18 are arranged rearwardly at a downward inclination so that the pairs of cushions 17 and 19 are normally disposed in a rearwardly inclined position for insuring maximum comfort to the persons occupying the seats.

Secured to the bottom of the front seat base 14 at the rear thereof are pairs of sockets 20 for a purpose which will be later described. The front seat also includes a pair of seat backs 21 which are normally arranged in side by side relation in close contact with one another at their meeting edges to provide a substantially single back rest and the lower ends of the back rests are provided each with a pair of depending cone or wedge shaped pins or standards 22 which are rearwardly angled at their lower ends, as clearly shown in Figure 5 of the drawings. The pins or standards 22 are adapted to be snugly received within the sockets 20 for removably securing the pair of back rests 21 in position, when the seat cushions 17 are placed in operative position.

In view of the above construction it will be seen that the front seat back rests 21 may be removed by displacing the pair of seat cushions 17 and then simply lifting the back rests 21 upwardly and forwardly until the standards or pins 22 are disengaged from the sockets or keepers 20, while a mere reversal of this operation will result in operatively positioning the back rests 21 for seating purposes.

The rear seat base 14 is spaced from the rear wall of the body A and directly in rear of the rear seat base 14 is disposed a pair of transversely extending relatively heavy leaf springs 23 which form means for supporting the pair of rear back rests 24 in an elevated position. Between the rear pair of back rests 24 are preferably arranged clothes compartments 25 and one of the shelves thereof can be provided with keepers 26 arranged in pairs for each back rest 24. The rear face of each back rest 24 carries rigid latches 27 which are normally urged by the springs 23 into engagement with their respective keepers 26. Forward and upward movement of the rear back rests 24 is prevented by the interengagement of the latches 27 with their keepers 26.

When it is desired to remove one or both of the back rests 24 of the rear seat, it is merely necessary to push down on the back rests 24 against the tension of the leaf springs 23, which will disengage the companion latches 27 from the keepers 26 and upon forward swinging movement of the back rests, the same can be removed.

The back rests 24 form a part of the bed bottom and in front of the rear seat and in rear of the front seat I provide a transversely extending foot rest 28 which terminates substantially in the same plane as the upper edge of the base 14 for the rear seat and this foot rest forms a support for the rear back rests 24 when the same are used for part of the bed bottom.

With the seat cushions and seat backs of the front and rear seats made in two sections, the following bed may be arranged for sleeping or resting.

By removing one section of the back rest 24 and sliding one section 19 of the rear seat cushion rearwardly and placing one edge of the back rest 24 on the foot rest 28 and the other edge on the rear base 14, a child's bed and one seat in rear and two seats in front is formed. By removing one back rest 21 of the front seat on the same side of the car that has the back rest already removed and by sliding one section of the seat cushion 17 rearwardly and by placing the standards or pins 22 in the front sockets 29 formed in the flanges 18 and cross bars 18', one single full length bed is provided on one side of the car and one seat in rear and the driver's seat in front. By removing the other section of the rear cushion 19 and back rest 24, one single adult bed is provided and a child's bed and a driver's seat is given. By removing the cushion and back rest of the driver's seat, a full size bed is provided. By leaving the cushions and the back rests of the front seat in normal operative position, both sections of the cushion and back rests of the rear seat can be converted into a bed, making ample room for several children and retaining seats for two or three persons in front.

From the foregoing description, it can be seen that I have provided a novel arrangement of seat cushions and backs for forming a variety of different characters of beds and seats. While the structure has been shown a closed vehicle body of the sedan type, it is to be understood that the same can be employed in a closed vehicle body of the coach type.

Changes in details may be made without departing from the spirit or the scope of this invention, but

What I claim as new is:

In a structure of the class described, a vehicle body, spaced front and rear bases within the body and having spaced front and rear walls defining intervening recesses, seat cushions in said recesses and movable to rest on the rear walls of said bases, a removable back cushion mounted at the rear of said rear base and adapted to rest on the front wall of the rear base between the said seat cushions, a foot rest between the front and rear bases and forming a support for the forward portion of the removable back, when the removable back is positioned between said cushions, a removable back for the front seat cushion and having attaching elements provided with angularly extending terminal portions, and socket members for engagement by the angularly extending terminal portions of said attaching elements, said back for the front seat cushion being adapted to rest on the front wall of the front base to form a head rest, there being means associated with the front base for sliding engagement by the angularly extending terminal portions of said attaching elements allowing said angularly extending terminal portions to have pressure contact with the seat cushion of the front base.

In testimony whereof I affix my signature.

JOSEPH L. RICHARDSON.